US009236625B2

(12) United States Patent
Otsuka et al.

(10) Patent No.: US 9,236,625 B2
(45) Date of Patent: Jan. 12, 2016

(54) SOLID OXIDE FUEL CELL SYSTEM

(75) Inventors: Toshiharu Otsuka, Nakama (JP);
Katsuhisa Tsuchiya, Chigasaki (JP);
Takuya Matsuo, Yokohama (JP);
Yousuke Akagi, Chigasaki (JP)

(73) Assignee: TOTO LTD., Fukuoka (JP)

( * ) Notice: Subject to any disclaimer, the term of this patent is extended or adjusted under 35 U.S.C. 154(b) by 184 days.

(21) Appl. No.: 14/342,965

(22) PCT Filed: Sep. 6, 2012

(86) PCT No.: PCT/JP2012/072696
§ 371 (c)(1),
(2), (4) Date: Mar. 5, 2014

(87) PCT Pub. No.: WO2013/035771
PCT Pub. Date: Mar. 14, 2013

(65) Prior Publication Data
US 2014/0212778 A1    Jul. 31, 2014

(30) Foreign Application Priority Data

Sep. 7, 2011   (JP) ................................ 2011-194719
Jun. 22, 2012  (JP) ................................ 2012-141039

(51) Int. Cl.
*H01M 8/06*   (2006.01)
*H01M 8/04*   (2006.01)
*H01M 8/12*   (2006.01)

(52) U.S. Cl.
CPC ........ *H01M 8/0618* (2013.01); *H01M 8/04738* (2013.01); *H01M 8/04776* (2013.01); *H01M 8/04955* (2013.01); *H01M 2008/1293* (2013.01); *Y02E 60/50* (2013.01)

(58) Field of Classification Search
CPC .......... H01M 8/0618; H01M 8/04955; H01M 8/04776; H01M 2008/1293; H01M 8/04738; Y02E 60/50
See application file for complete search history.

(56) References Cited

U.S. PATENT DOCUMENTS

2006/0024541 A1*  2/2006  Weiss ..................... C01B 3/386
                                                       429/414
2007/0281203 A1   12/2007  Kobayashi et al.
(Continued)

FOREIGN PATENT DOCUMENTS

| JP | 2006-190605 A | 7/2006 |
| JP | 2007-319737 A | 12/2007 |
| JP | 2011-009196 A | 1/2011 |

OTHER PUBLICATIONS

International Search Report for International Application No. PCT/JP2012/072696, dated Nov. 13, 2012, 2 pages.

*Primary Examiner* — Raymond Alejandro
(74) *Attorney, Agent, or Firm* — Brinks Gilson & Lione

(57) ABSTRACT

To provide a solid oxide fuel cell system with which the durable lifespan of the reformer can be extended by suppressing temperature unevenness in the reformer. The present invention is a solid oxide fuel cell, including a fuel cell module, a reformer for producing hydrogen by POX, ATR, and SR steps; a fuel supply apparatus, a reform air supply apparatus, a water supply apparatus, a generating air supply apparatus, and a control device which, as the temperature inside the fuel cell module rises, executes in sequence POX, ATR and SR steps at predetermined respective temperature bands, and causes a rise in temperature at which electrical generation is possible; wherein the control device comprises a localized temperature rise suppression circuit which, by causing steam reforming to occur locally within the reformer in the POX step, suppresses localized temperature rises in the reformer.

7 Claims, 10 Drawing Sheets

(56) References Cited

U.S. PATENT DOCUMENTS

| | | | | |
|---|---|---|---|---|
| 2009/0291335 A1* | 11/2009 | Anzai | ................... | C01B 3/382 429/420 |
| 2010/0133475 A1 | 6/2010 | Kobayashi et al. | | |
| 2010/0143814 A1* | 6/2010 | Harrington | ....... | H01M 8/04014 429/434 |
| 2010/0304245 A1 | 12/2010 | Tsuchiya et al. | | |
| 2011/0189566 A1* | 8/2011 | Hatada | ..................... | C01B 3/38 429/425 |

* cited by examiner

FIG.12

| MODE | STATE | FUEL FLOW AMOUNT (L/min) | REFORMING AIR FLOW AMOUNT (L/min) | GENERATING AIR FLOW AMOUNT (L/min) | PURE WATER FLOW AMOUNT (mL/min) | STATE TRANSITION CONDITION (°C) REFORMER TEMP. | STATE TRANSITION CONDITION (°C) CELL STACK TEMP. | $O_2/C$ |
|---|---|---|---|---|---|---|---|---|
| | COMBUSTION OPERATION | 6.0 | 18 | 100.0 | 1.0 | ≧300°C | — | 0.54 |
| STARTUP MODE | POX1 | 6.0 | 18 | 100.0 | 1.0 | ≧350°C | — | 0.54 |
| | POX2 | 5.0 | 15 | 100.0 | 1.0 | ≧600°C | ≧250°C | 0.54 |
| | ATR1 | 5.0 | 7 | 100.0 | 2.0 | ≧600°C | ≧400°C | 0.25 |
| | ATR2 | 4.0 | 5 | 100.0 | 3.0 | ≧650°C | ≧600°C | 0.23 |
| | SR1 | 3.0 | 0 | 100.0 | 8.0 | ≧650°C | ≧650°C | |
| | SR2 | 2.3 | 0 | 80.0 | 6.3 | ≧650°C | ≧700°C | |

SOLID OXIDE FUEL CELL SYSTEM

This application is a 371 application of PCT/JP2012/072696 having an international filing date of Sep. 6, 2012, which claims priority to JP2011-194719 filed Sep. 7, 2011 and JP2012-141039 filed Jun. 22, 2012, the entire contents of which are incorporated herein by reference.

TECHNICAL FIELD

The present invention pertains to a solid oxide fuel cell system, and more particularly to a solid oxide fuel cell system in which electrical power is produced by reacting fuel and oxidant gas for electrical generation.

BACKGROUND ART

Conventionally, solid oxide fuel cells (SOFC) are constituted so that in the startup step, multiple steps for reforming fuel in the reformer are passed through, being the partial oxidation reforming reaction step (the POX step), the auto-thermal reforming reaction step (the ATR step), and the steam reforming reaction step (the SR step); there is then a transition to electrical power generation (see Patent Document 1, for example).

In an SOFC, by executing these steps in sequence, the temperature of the reformer, fuel cell stack, and the like disposed within a fuel cell module housing chamber can be raised to an operating temperature. I.e., at startup of the solid oxide fuel cell, once the reformer is heated by combustion of fuel and the reformer temperature rises somewhat, the partial oxidation reforming reaction (POX step), which is an exothermic reaction, is generated by the reaction of fuel and reforming air in the reformer. Next, when the reformer temperature rises further due to the fuel combustion heat and reaction heat from the partial oxidation reforming reaction, water is introduced into the reformer, and the endothermic steam reforming reaction (the ATR step) is occurring in addition to the partial oxidation reforming reaction. Also, when the reformer temperature rises, the supply of air for reforming is stopped, and only the steam reforming reaction (the SR step) occurs inside the reformer. Electricity is generated in the fuel cell stack using hydrogen produced by this steam reforming reaction.

Patent Document 1: JP 2004-319420 A

SUMMARY OF THE INVENTION

Problems the Invention Seeks to Resolve

At startup, however, during the POX step in which the reformer is heated, there is unevenness in the partial oxidation reforming reaction generated in the reformer, and in parts where the partial oxidation reforming reaction occurs inside the reformer, the temperature rises due to the heat generated by the partial oxidation reforming reaction. When the temperature rises in a part of the reformer, the partial oxidation reforming reaction is further promoted in that part, so that parts where the temperature is high are even further heated. Thus once temperature unevenness occurs within the reformer in the POX step, the high temperature parts are still further heated by the heat produced by the partial oxidation reforming reaction, thereby tending to promote temperature unevenness even further. If this state continues over a long period, the usable life of the reformer may be shortened by degradation of the reforming catalyst, or the reformer may be damaged.

Therefore the present invention has the object of providing a solid oxide fuel cell capable of extending the durable lifespan of the reformer, or preventing damage to the reformer, by suppressing temperature unevenness in the reformer.

Means for Resolving Problems

In order to resolve the above-described problems, the present invention is a solid oxide fuel cell system in which electrical power is produced by reacting fuel and oxidant gas for electrical generation, comprising: a fuel cell module equipped with a fuel cell stack; a reformer, disposed inside the fuel cell module, that produces hydrogen by performing a POX step, an ATR step, and an SR step, wherein in the POX step a reforming reaction for partial oxidation reforming of fuel is performed by chemically reacting the fuel with oxidant gas, in the ATR step a reforming reaction for auto-thermal reforming of fuel is performed by simultaneously bringing about the partial oxidant reforming reaction and a steam reforming reaction in which fuel and steam are chemically reacted, and in the SR step a reforming reaction is performed by the steam reforming only; a combustion chamber, disposed inside the fuel cell module, wherein fuel which has passed through the reformer and the fuel cell stack is combusted to heat the reformer; a fuel supply apparatus that feeds fuel reformed by the reformer to the fuel cell stack by supplying fuel to the reformer; a reforming oxidant gas supply apparatus that supplies reforming oxidant gas to the reformer; a water supply apparatus that supplies reforming water to the reformer; an electrical generation oxidant gas supply apparatus that supplies electrical generating oxidant gas for electrical generation to the fuel cell stack; and a control device that controls the fuel supply apparatus, the reforming oxygen gas supply apparatus, the water supply apparatus, and the electrical generating oxidant gas supply apparatus based on the temperature in the fuel cell module so that the POX step, the ATR step, and the SR step are executed in predetermined respective temperature bands in sequence inside the reformer, to raise the temperature of the fuel cell stack to the temperature at which electrical generation is possible; wherein the control device includes a localized temperature rise suppression circuit that suppressed localized temperature rises in the reformer by inducing steam reforming in parts within the reformer when there are localized excessive temperature rises during the POX step.

In the invention thus constituted, the control device respectively controls the fuel supply apparatus, the reforming oxidant gas supply apparatus, and the water supply apparatus to supply fuel, reforming oxidant gas, and water to the reformer. Inside the reformer during the startup step, the control device sequentially causes partial oxidation reforming, auto-thermal reforming, and steam reforming to occur, and sequentially implements the POX step, the ATR step, and the SR step, heating the fuel cell stack up to a temperature at which electrical generation is possible. A localized temperature rise suppression circuit with which the control device is equipped, by inducing localized steam reforming in parts when localized excessive temperature rises occur during the POX step, suppresses localized temperature rises in the reformer using the endothermic steam reforming reaction, thereby suppressing temperature unevenness inside the reformer and enabling the temperature to be raised in a stable and uniform manner throughout the reformer. The durable lifespan of the reformer can also be extended, and damage to the reformer prevented.

In the invention thus constituted, the localized temperature rise suppression circuit induces localized steam reforming in parts when localized excessive temperature rises occur inside the reformer during the POX step, suppressing localized temperature rises with the endothermic steam reforming reaction. Temperature unevenness in the reformer is thus suppressed, and the temperature of the entire reformer can be stably and uniformly raised. The durable lifespan of the reformer can also be extended, and damage to the reformer prevented.

In the present invention the reformer preferably includes a vaporizing section that vaporizes water supplied from the water supply apparatus, and reforming oxidant gas from the reforming oxidant gas supply apparatus is supplied to the vaporizing section; and a reforming section adjacently disposed on the downstream side of the vaporizing section, that reforms fuel using a catalyst; wherein fuel and reforming oxidant gas supplied from the fuel supply apparatus and the reforming oxidant gas supply apparatus flow into the upstream side of the reforming section through the vaporizing section.

In the invention thus constituted, fuel and reforming oxidant gas supplied from the fuel supply apparatus and the reforming oxidant gas supply apparatus flow in on the upstream side of the reforming section through the vaporizing section, therefore excessive temperature rises are prone to occur near the inflow port into the reforming section from the vaporizing section due to localized excessive partial oxidation reforming.

In the invention thus constituted, if localized temperature rises occur near the inflow port on the upstream side of the reforming section, steam can be quickly provided to those parts from the vaporizing section. Also, if there is a localized temperature rise near the inflow port, the temperature of the vaporizing section adjacently disposed to the reforming section also rises, promoting the vaporizing of supplied water, and more steam can be supplied in response to localized temperature rises.

In the present invention the control device preferably controls the fuel supply apparatus and the reforming oxidant gas supply device so that in the POX step, the ratio $O_2/C$ of oxygen $O_2$ in the reforming oxidant gas to carbon C in the fuel is 0.4 or greater, and in the ATR step the ratio $O_2/C$ is 0.2 or greater and less than 0.4, so that reforming of fuel can be carried out by the partial oxidation reforming reaction alone in the reformer, and the localized temperature rise suppression circuit supplies water to the vaporizing section using the water supply device at an $O_2/C$ ratio at 0.4 or greater.

In the present invention thus constituted, when the ratio of oxygen $O_2$ to carbon C, $O_2/C$ is at a proportion such that fuel reforming can occur by the heat of the partial oxidation reforming reaction alone, the localized temperature rise suppression circuit supplies water to the vaporizing section. Therefore in a state in which localized excessive temperature rises are prone to occur in the reformer, steam reforming can be reliably implemented if an excessive temperature rise does occur, and deleterious effects on the catalyst inside the reformer can be suppressed.

In the present invention the localized temperature rise suppression circuit preferably supplies water to the vaporizing section using the water supply apparatus during the entire period of the POX step.

In the invention thus constituted, water is supplied during the entire period of the POX step in which a temperature rise can easily occur, hence degradation of the reformer due to excessive temperature rise can be reliably prevented.

In the present invention the localized temperature rise suppression circuit preferably starts the supply of water to the reformer before the temperature inside the fuel cell module rises to the temperature band at which the POX step is executed.

In the invention thus constituted, the supply of water to the reformer is started before the temperature rises to the temperature band at which the POX step is executed, therefore excessive temperature rises in the reformer caused by localized excessive partial reforming can be reliably suppressed.

In the present invention the localized temperature rise suppression circuit preferably causes the supply of water to the reformer to begin after fuel introduced into the combustion chamber is ignited.

In the invention thus constituted, the supply of water to the reformer is started after fuel is ignited, therefore the negative effects of water introduced into the reformer remaining there for long periods without being vaporized can be prevented, and localized excessive partial reforming when the temperature of the entire reformer is relatively low can be reliably suppressed.

In the present invention the localized temperature rise suppression circuit preferably controls the water supply apparatus, causing water to be supplied to the reformer either continuously or intermittently, and the amount of water supplied per unit time by the localized temperature rise suppression circuit is less than the amount of water supplied per unit time in the ATR step.

In the invention thus constituted, water is supplied to the reformer continuously or intermittently, therefore rapid temperature drops in the reformer caused by a large quantity of water being supplied at once, thereby causing a large amount of steam reforming to occur over a short period, can be prevented. Also, the amount of water supplied by the localized temperature rise suppression circuit is set to be less than the amount of water in the ATR step, so in the POX step, a large amount of steam reforming occurs for the purpose of suppressing localized excessive temperature rises and preventing a delay in the overall temperature rise of the reformer.

Effect of the Invention

In the solid oxide fuel cell of the present invention, the durable lifespan of the reformer can be extended and damage to the reformer can be prevented by suppressing temperature unevenness in the reformer.

BRIEF DESCRIPTION OF THE DRAWINGS

FIG. 12: A table of the startup processing operations in a solid oxide fuel cell according to an embodiment of the present invention.

DETAILED DESCRIPTION OF THE PREFERRED EMBODIMENTS

Next, referring to the attached drawings, we discuss a solid oxide fuel cell (SOFC) system according to an embodiment of the present invention.

Figure 1:
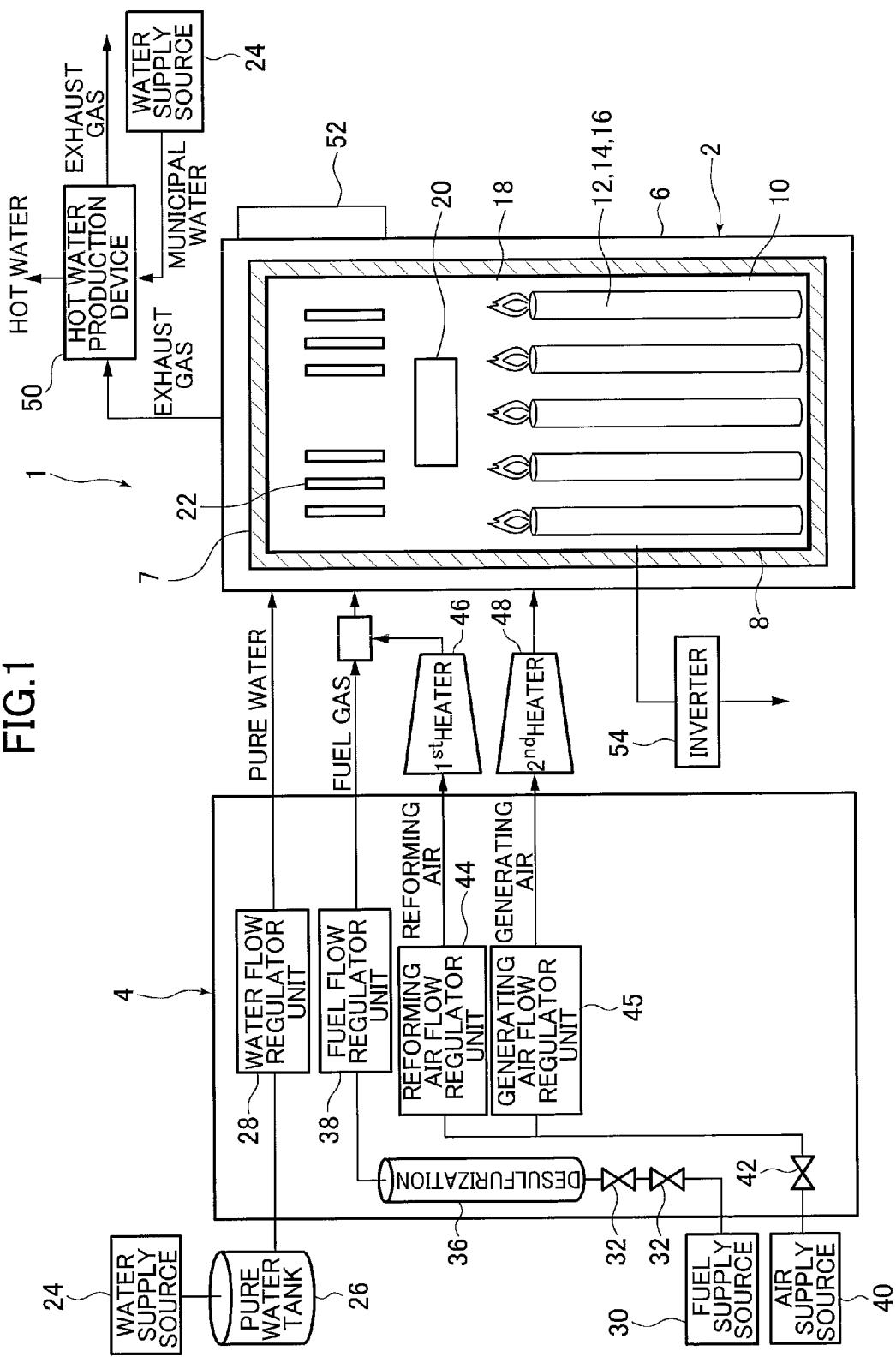
FIG. 1: An overview schematic of a fuel cell apparatus according to an embodiment of the present invention.

FIG. 1 is an overview diagram showing a solid oxide fuel cell (SOFC) according to an embodiment of the present invention. As shown in FIG. 1, the solid oxide fuel cell (SOFC) 1 of this embodiment of the invention comprises a fuel cell module 2 and an auxiliary unit 4.

Fuel cell module 2 comprises a housing 6; a sealed space 8 is formed within this housing 6, mediated by heat storage material 7. A fuel cell assembly 12 for carrying out an electrical generating reaction using fuel and oxidant (air) is disposed on generating chamber 10, which is the lower part of this sealed space 8. This fuel cell assembly 12 comprises 10 fuel cell stacks 14 (see FIG. 5), and fuel cell stack 14 comprises 16 fuel cell units 16 (see FIG. 4). Fuel cell assembly 12 thus has 160 fuel cell units 16, all of which are serially connected.

A combustion chamber 18 is formed at the top of the above-described generating chamber 10 in sealed space 8 of fuel cell module 2; in combustion chamber 18, residual fuel gas and residual oxidizer (air) not used in the electrical generation reaction combust, producing exhaust gas.

Reformer 20 for reforming fuel is disposed at the top of combustion chamber 18; combustion heat from residual gas heats reformer 20 to a temperature at which the reforming reaction can occur. Furthermore, an air heat exchanger 22 is disposed at the top of this reformer 20 for receiving heat from reformer 20 and heating air to suppress a temperature drop in the reformer 20.

Next, auxiliary unit 4 comprises a pure water tank 26 for holding water from a municipal or other water supply source 24 and filtering it into pure water, and a water flow regulator unit 28 (a "water pump" or the like driven by a motor) for regulating the flow volume of water supplied from the reservoir tank. Auxiliary unit 4 comprises a gas shutoff valve 32 for shutting off gas supplied from a municipal gas or other fuel supply source 30, a desulfurizer 36 for removing sulfur from fuel gas, and a fuel flow regulator unit 38 (a motor-driven "fuel pump" or the like) for regulating the flow volume of fuel gas. Furthermore, an auxiliary unit 4 comprises: electromagnetic valve 42 for shutting off air serving as oxidizer and supplied from an air supply source 40, reforming air flow regulator unit 44, and generating air flow regulator unit 45 (a motor-driven "air blower" or the like) for regulating air flow volume, a first heater 46 for heating reforming air supplied to the reformer 20, and a second heater 48 for heating generating air supplied to the generating chamber. This first heater 46 and second heater 48 are provided to efficiently raise the temperature at startup, but may be omitted.

Next, connected to fuel cell module 2 is a hot-water production device 50, supplied with exhaust gas. Municipal water from a water supply source 24 is supplied to this hot-water production device 50; this water is turned into hot water by the heat of the exhaust gas and supplied to a hot water reservoir tank in an external water heater, not shown.

A control box 52 for controlling the amount of fuel gas supplied, etc. is connected to fuel cell module 2.

In addition, an inverter 54 serving as an electrical power extraction unit (electrical power conversion unit) for supplying electrical power generated by the fuel cell module to the outside is connected to fuel cell module 2.

Figure 2:
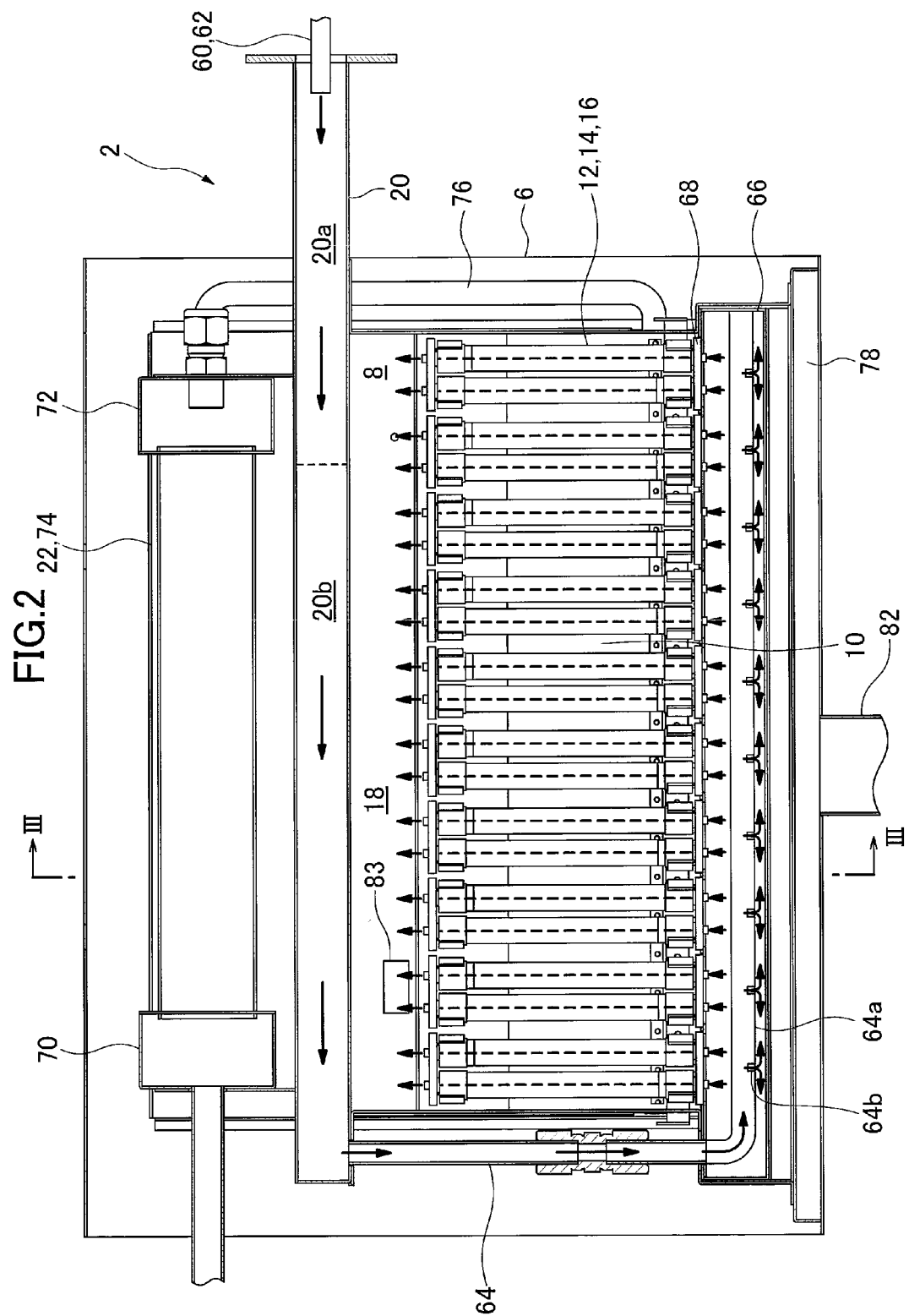
FIG. 2: A front elevation cross section showing the fuel cell module of a fuel cell apparatus according to an embodiment of the present invention.
Figure 3:
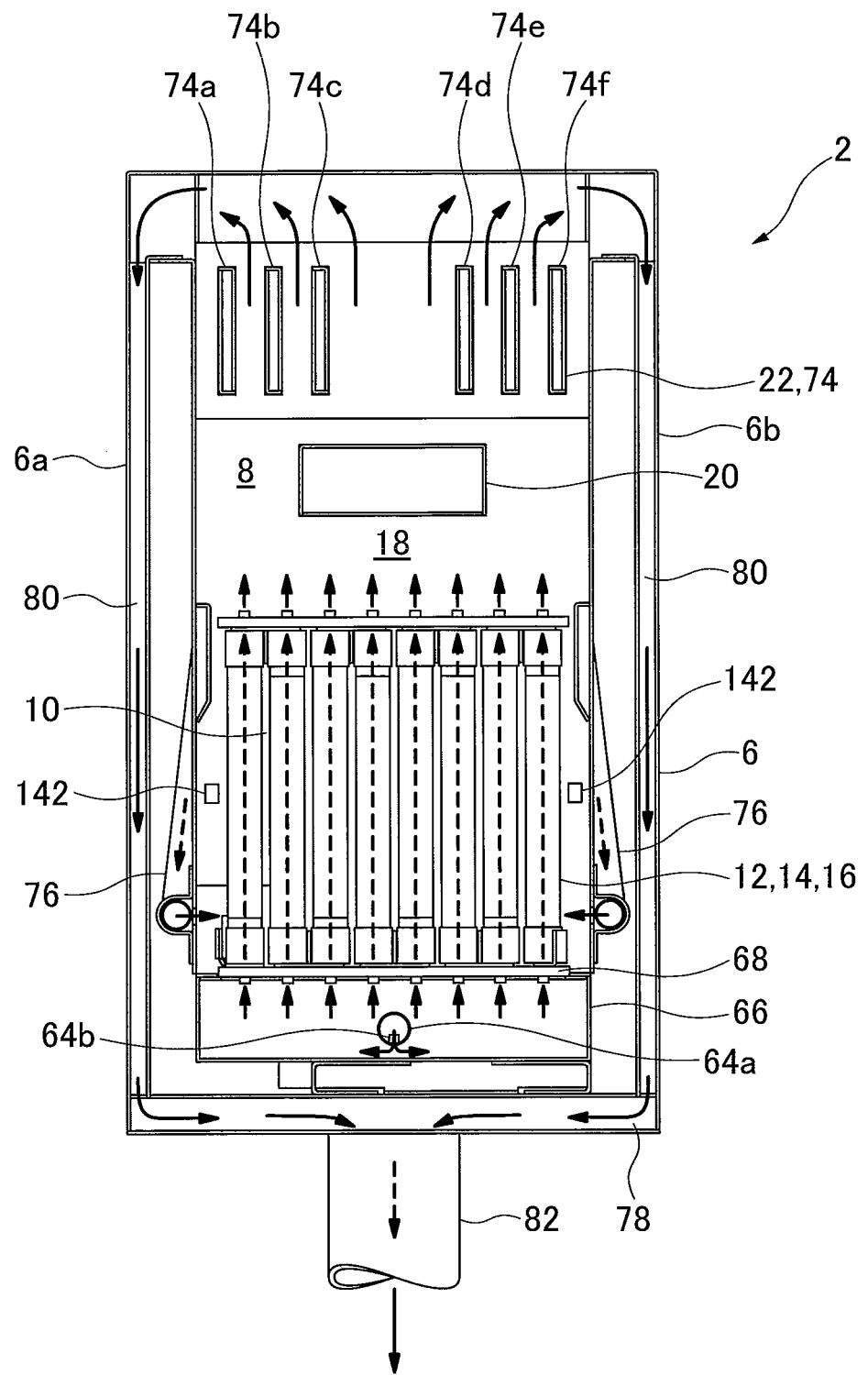
FIG. 3: A cross section along line in FIG. 2.

Next, the internal structure of the solid oxide fuel cell (SOFC) fuel cell module of this embodiment of the invention is explained using FIGS. 2 and 3. FIG. 2 is a side elevation cross section showing a fuel cell module in a solid oxide fuel cell (SOFC) according to an embodiment of the present invention; FIG. 3 is a cross section along line III-III of FIG. 2.

As shown in FIGS. 2 and 3, disposed starting from the bottom in sealed space 8 inside the housing 6 in fuel cell module 2, in order, are fuel cell assembly 12, reformer 20, and air heat exchanger 22, as described above.

A pure water guide pipe 60 for introducing pure water into the upstream end of reformer 20, and a reform gas guide pipe 62 for introducing fuel gas and reforming air to be reformed, are attached to reformer 20; a vaporizing section 20*a* and a reforming section 20*b* are formed in sequence starting from the upstream side within reformer 20; the reforming section 20*b* is filled with reforming catalyst. Fuel gas and air, blended with steam (pure water) introduced into reformer 20, is reformed using the reforming catalyst with which reformer 20 is filled. Reforming catalysts in which nickel is applied to the surface of aluminum spheres, or those in which ruthenium is imparted to the surface of aluminum spheres, are used as appropriate.

A fuel gas supply line 64 is connected to the downstream end of reformer 20; this fuel gas supply line 64 extends downward, then further extends horizontally within a manifold formed under fuel cell assembly 12. Multiple fuel supply holes 64*b* are formed on the bottom surface of the horizontal portion 64*a* of fuel gas supply line 64; reformed fuel gas is supplied into manifold 66 from these fuel supply holes 64*b*.

A lower support plate 68 provided with through holes supporting the above-described fuel cell stack 14 is attached at the top of manifold 66, and fuel gas in manifold 66 is supplied into fuel cell units 16.

Next, an air heat exchanger 22 is provided over reformer 20. Air heat exchanger 22 comprises an air concentration chamber 70 on the upstream side and two air distribution chambers 72 on the downstream side; the air concentration chamber 70 and distribution chambers 72 are connected using 6 air flow conduits 74. Here, as shown in FIG. 3, three air flow conduits 74 form a set (74*a*, 74*b*, 74*c*, 74*d*, 74*e*, 74*f*); air in air concentration chamber 70 flows from each set of air flow conduits 74 to the respective air distribution chambers 72.

Air flowing through the 6 air flow conduits 74 of the air heat exchanger 22 is pre-heated by rising combustion exhaust gas from combustion chamber 18.

Air guide pipes 76 are connected to each of the respective air distribution chambers 72; these air guide pipes 76 extend downward, communicating at the bottom end side with the lower space in generating chamber 10, and introducing pre-heated air into generating chamber 10.

Next, an exhaust gas chamber 78 is formed below manifold 66. As shown in FIG. 3, an exhaust gas conduit 80 extending vertically is formed on the inside of front surface 6*a* and rear surface 6*b*, which are faces in the long direction of housing 6; the top end of exhaust gas chamber conduit 80 communicates with the space where air heat exchanger 22 is disposed, and the bottom end communicates with exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water production device 50 shown in FIG. 1.

As shown in FIG. 2, an ignition device 83 for starting the combustion of fuel gas and air is disposed on combustion chamber 18.

Figure 4:
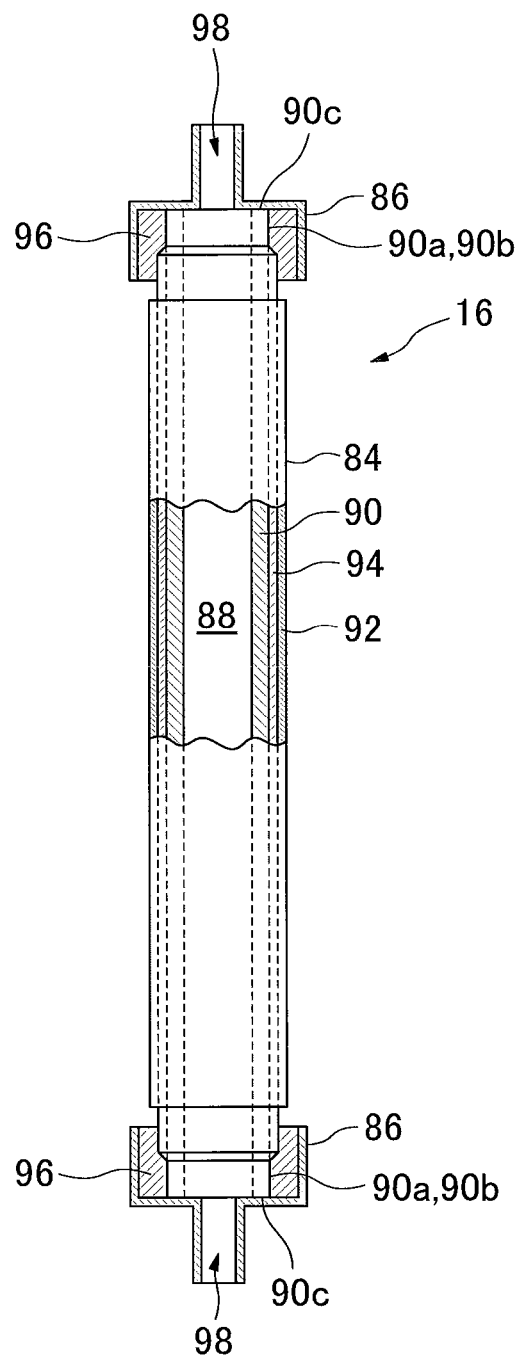
FIG. 4: A partial cross section showing an individual fuel cell unit in a fuel cell apparatus according to an embodiment of the present invention.

Next, referring to FIG. 4, we explain fuel cell units 16. FIG. 4 is a partial section showing a solid oxide fuel cell (SOFC) fuel cell unit according to an embodiment of the present invention.

As shown in FIG. 4, fuel cell units 16 comprise a fuel cell 84 and internal electrode terminals 86, respectively connected to the terminals at the top and bottom of fuel cell 84.

Fuel cell 84 is a tubular structure extending vertically, equipped with a cylindrical internal electrode layer 90, on the inside of which is formed a fuel gas flow path 88, a cylindrical external electrode layer 92, and an electrolyte layer 94 between internal electrode layer 90 and external electrode layer 92. This internal electrode layer 90 is a fuel electrode through which fuel gas passes, and has a (−) polarity, while the external electrode layer 92 is an air-contacting electrode with a (+) polarity.

The internal electrode terminals 86 attached at the top and bottom ends of fuel cell units 16 have the same structure, therefore here we specifically discuss internal electrode terminal 86 attached at the top end. The top portion 90a of inside electrode layer 90 comprises an outside perimeter surface 90b and top end surface 90c, exposed to electrolyte layer 94 and outside electrode layer 92. Inside electrode terminal 86 is connected to the outer perimeter surface of inside electrode layer 90 through conductive seal material 96, and is electrically connected to inside electrode layer 19 by direct contact with the top end surface 90c of inside electrode layer 90. A fuel gas flow path 98 communicating with inside electrode layer 90 fuel gas flow path 88 is formed at the center portion of inside electrode terminal 86.

Inside electrode layer 90 is formed, for example, from at least one of a mixture of Ni and zirconia doped with at least one type of rare earth element selected from among Ni, Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

Outside electrode layer 92 is formed, for example, from at least one of the following: lanthanum manganite doped with at least one element selected from among: Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
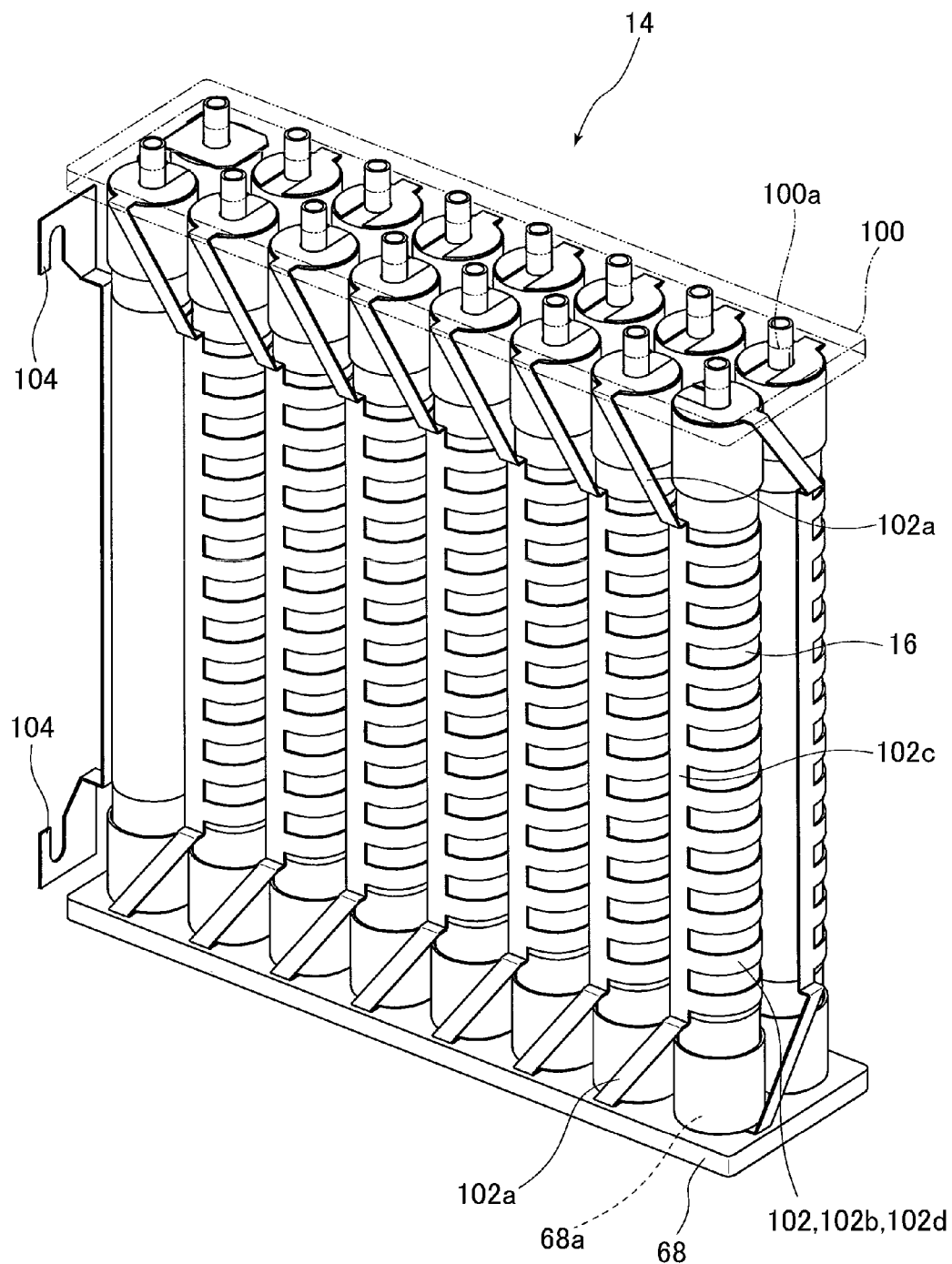
FIG. 5: A perspective view showing a fuel cell stack in a fuel cell apparatus according to an embodiment of the present invention.

Next, referring to FIG. 5, we explain fuel cell stack 14. FIG. 5 is a perspective view showing the fuel cell stack in a solid oxide fuel cell (SOFC) according to an embodiment of the present invention.

As shown in FIG. 5, fuel cell stack 14 comprises sixteen fuel cell units 16; the top and bottom ends of these fuel cell units 16 are respectively supported by a lower support plate 68 and upper support plate 100. Through holes 68a and 100a, through which inside electrode terminal 86 can penetrate, are provided on this lower support plate 68 and outer support plate 100.

In addition, a collector 102 and an external terminal 104 are attached to fuel cell units 16. This collector 102 is integrally formed by a fuel electrode connecting portion 102a, electrically connected to inside electrode terminal 86 attached to inside electrode layer 90 serving as the fuel electrode, and by an air electrode connecting portion 102b, electrically connected to the entire external perimeter of outside electrode layer 92 serving as the air electrode. Air electrode connecting portion 102b is formed of a plumb portion 102c extending vertically along the surface of outside electrode layer 92, and multiple horizontal portions 102d extending horizontally from this vertical portion 102c along the surface of outside electrode layer 92. Fuel electrode connecting portion 102a extends in a straight line, in an upward or downward diagonal direction from the vertical portion 102c of air electrode connecting portion 102b, toward inside electrode terminals 86 positioned vertically on fuel cell units 16.

Furthermore, electrode terminals 86 at the top and bottom ends of the two fuel cell units 16 positioned at the end of fuel cell stack 14 (at the front and back on the left side in FIG. 5) are respectively connected to outside terminals 104. These external terminals 104 are connected to external terminals 104 (not shown) at the ends of adjacent fuel cell stack 14, and as described above, all of the 160 fuel cell units 16 are connected in series.

Figure 6:
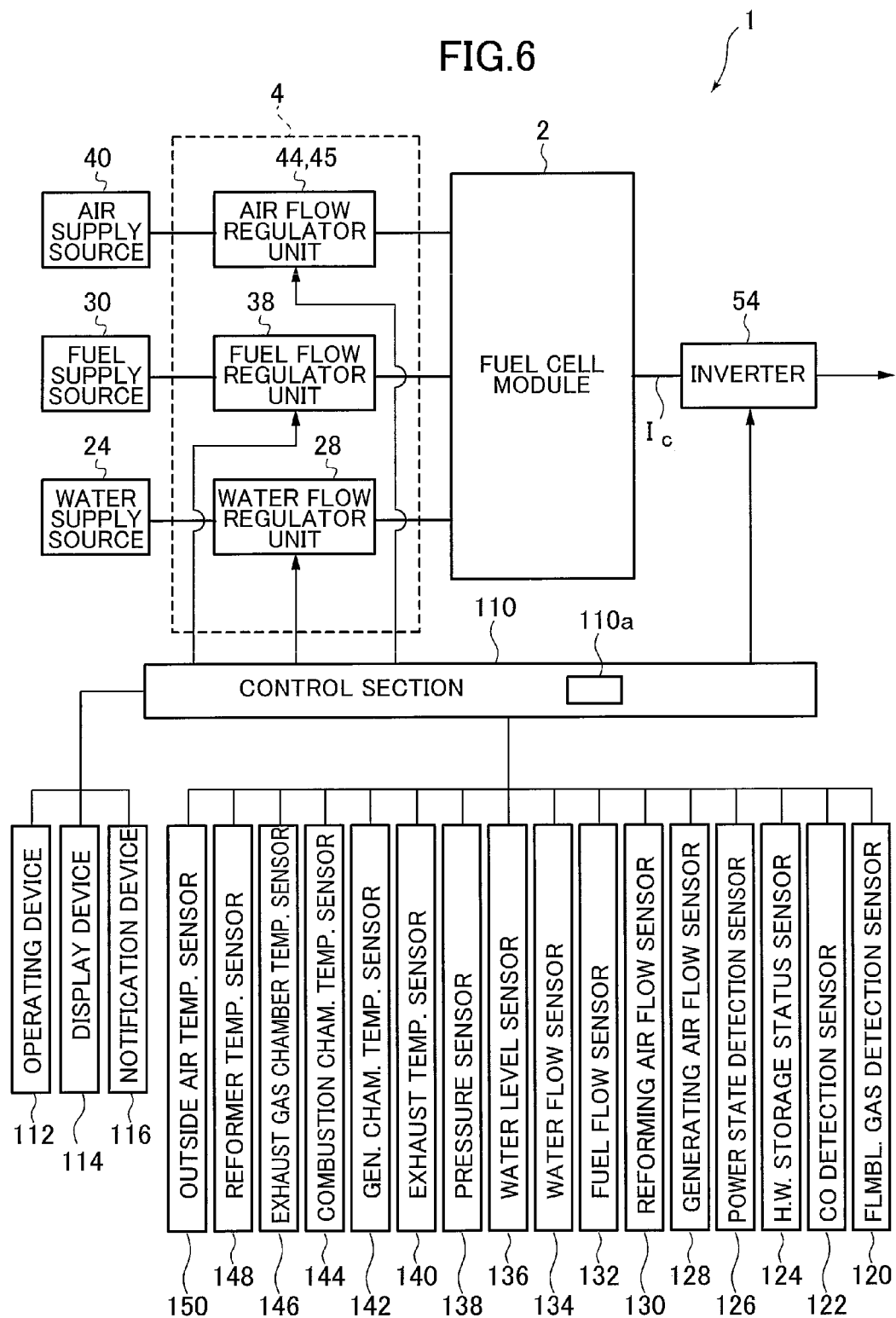
FIG. 6: A block diagram showing a fuel cell assembly according to an embodiment of the present invention.

Next, referring to FIG. 6, we discuss the sensors attached to the solid oxide fuel cell (SOFC) according to the present embodiment. FIG. 6 is a block diagram showing a solid oxide fuel cell (SOFC) according to an embodiment of the present invention. As shown in FIG. 6, a solid oxide fuel cell device 1 comprises a control unit 110; connected to this control section 110 are: an operating device 112 provided with operating buttons such as "ON" or "OFF" for user operation; a display device 114 for displaying various data such as generator output (watts); and a notification device 116 for issuing warnings during abnormal states, etc. This notification device 116 may also be connected to a remote control center to inform the control center of anomalies.

Next, signals from the various sensors described below are input to control unit 110.

First, flammable gas detection sensor 120 is for sensing gas leaks, and is attached to fuel cell module 2 and auxiliary unit 4.

CO detection sensor 122 is for sensing whether CO in the exhaust gas, which is supposed to be exhausted to the outside via exhaust gas conduit 80, etc., has leaked into the external housing (not shown) which covers fuel cell module 2 and auxiliary unit 4.

A water reservoir state detection sensor 124 is for sensing the temperature and amount of hot water in a water heater (not shown).

Electrical power state detection sensor 126 is for sensing current, voltage, and the like in inverter 54 and in a distribution panel (not shown).

Generator air flow detection sensor 128 is for detecting the flow volume of generating air supplied to generating chamber 10.

Reforming air flow volume sensor 130 is for detecting the volume of reforming air flow supplied to reformer 20.

Fuel flow volume sensor 132 is for detecting the flow volume of fuel gas supplied to reformer 20.

Water flow volume sensor 134 is for detecting the flow volume of pure water supplied to reformer 20.

Water level sensor 136 is for detecting the water level in pure water tank 26.

Pressure sensor 138 is for detecting pressure on the upstream side outside reformer 20.

Exhaust temperature sensor 140 is for detecting the temperature of exhaust gas flowing into hot water producing device 50.

As shown in FIG. 3, generating chamber temperature sensor 142 is disposed on the front surface side and rear surface side around fuel cell assembly 12, and has the purpose of detecting the temperature near fuel cell stack 14 and estimating the temperature of fuel cell stack 14 (i.e., of the fuel cell 84 itself).

A combustion chamber temperature sensor 144 is for detecting the temperature in combustion chamber 18.

Exhaust gas chamber temperature sensor 146 is for detecting the temperature of exhaust gases in exhaust gas chamber 78.

Reformer temperature sensor 148 is for detecting the temperature of reformer 20; it calculates the reformer 20 temperature from the intake and exit temperatures on reformer 20.

Outside air temperature sensor 150 detects the temperature of the outside atmosphere in the case that a solid oxide fuel cell (SOFC) system is positioned outdoors. Sensors to detect outside atmospheric humidity and the like may also be provided.

Signals from these various sensors are sent to control unit 110; control unit 110 sends control signals to water flow regulator unit 28, fuel flow regulator unit 38, reforming air flow regulator unit 44, and generating air flow regulator unit 45 based on data from the sensors, and controls the flow volumes in each of these units.

Figure 7:
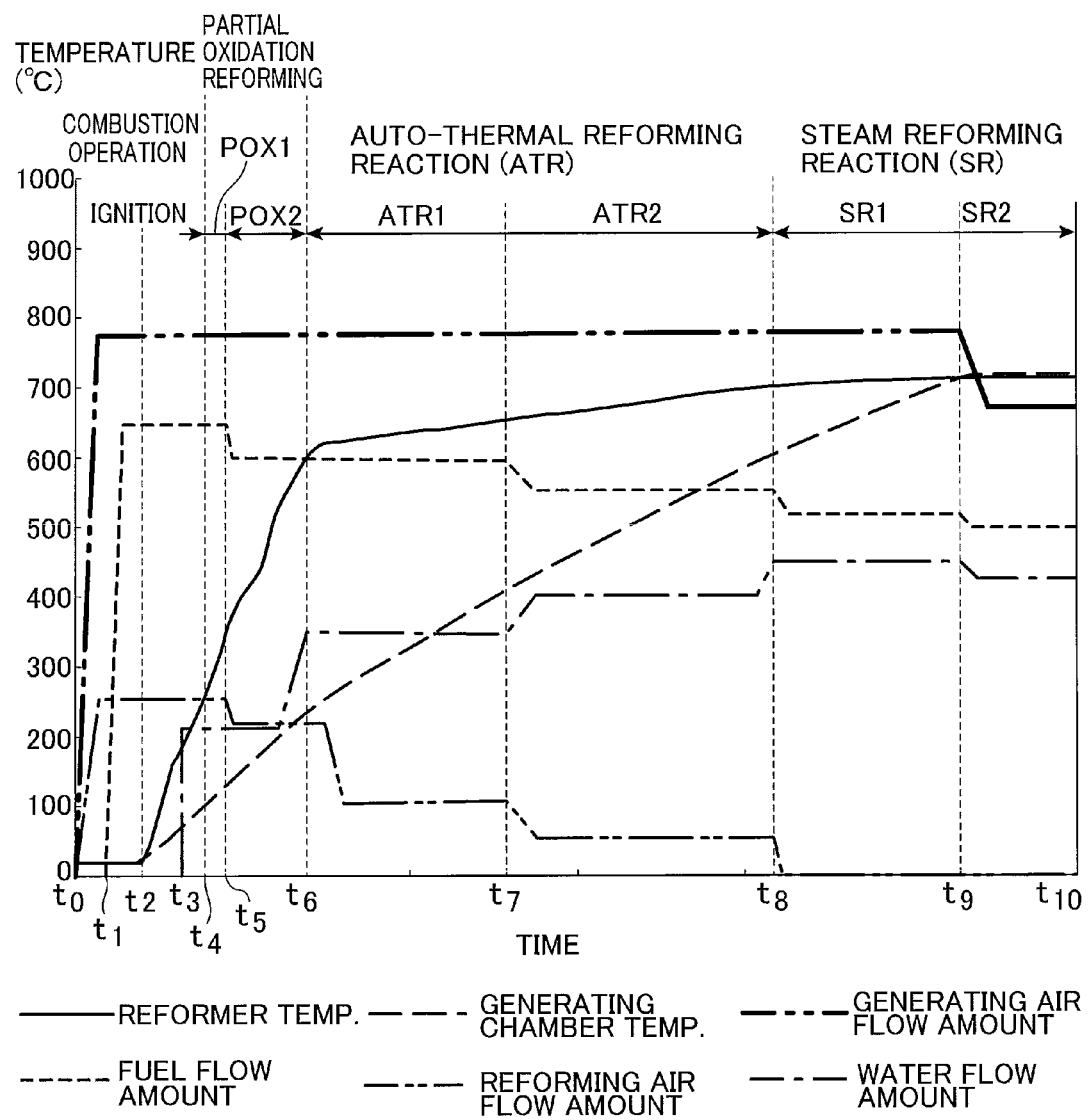
FIG. 7: A timing chart showing the operation at startup of a fuel cell assembly according to an embodiment of the present invention.

Next, referring to FIG. 7, we explain the operation of a solid oxide fuel cell (SOFC) system according to the present embodiment at the time of start up. FIG. 7 is a timing chart showing the operations of a solid oxide fuel cell (SOFC) according to an embodiment of the present invention at the time of start up.

At first, the operation starts in a no-load state, i.e., with the circuit containing fuel cell module 2 in an open state, in order to warm up fuel cell module 2. At this point current does not flow in the circuit, therefore fuel cell module 2 does not generate electricity.

First, reforming air is supplied from reforming air flow regulator unit 44 through first heater 46 to reformer 20 in fuel cell module 2. Simultaneously, generating air is supplied from generating air flow regulator unit 45 through second heater 48 to the air heat exchanger 22 on fuel cell module 2, and this generating air reaches generating chamber 10 and combustion chamber 18.

Immediately thereafter, fuel gas is also supplied from fuel flow regulator unit 38, and fuel gas into which reforming air is blended passes through reformer 20, fuel cell stack 14, and fuel cell units 16 to reach combustion chamber 18.

Next, ignition device 83 causes ignition, and fuel gas and air (reforming air and generating air) supplied to combustion chamber 18 are combusted. This combustion of fuel gas and air produces exhaust gas; generating chamber 10 is warmed by this exhaust gas, and when the exhaust gas rises in the sealed space 8 of fuel cell module 2 the fuel gas, which includes reforming air in reformer 20, is warmed, as is also the generating air inside air heat exchanger 22.

At this point, fuel gas into which reforming air is blended is supplied to reformer 20 by fuel flow regulator unit 38 and reforming air flow regulator unit 44, therefore the partial oxidation reforming reaction POX given by Expression (1) proceeds. This partial oxidation reforming reaction POX is an exothermic reaction, and therefore has good startup characteristics. This elevated-temperature fuel gas is supplied from fuel gas supply line 64 to the bottom of fuel cell stack 14, and by this means fuel cell stack 14 is heated from the bottom; combustion chamber 18 is also heated by the combustion of the fuel gas and air, so that fuel stack 14 is also heated from above, thereby enabling an essentially uniform rise in temperature along the vertical direction of fuel cell stack 14. Even though the partial oxidation reforming reaction POX is progressing, the ongoing combustion reaction between fuel gas and air is continued in combustion chamber 18.

$$C_mH_n + xO_2 \rightarrow aCO_2 + bCO + cH_2 \qquad (1)$$

After the partial oxidation reforming reaction starts, when reformer temperature sensor 148 senses that reformer 20 has reached a predetermined temperature (e.g., 600° C.), a premixture of fuel gas and reforming air is supplied to reformer 20 by water flow regulator unit 28, fuel flow regulator unit 38, and reforming air flow regulator unit 44. At this point the auto-thermal reforming reaction ATR, which makes use of both the aforementioned partial oxidation reforming reaction POX and the steam reforming reaction SR described below, proceeds in reformer 20. This auto-thermal reforming reaction ATR can be internally thermally balanced, therefore the reaction proceeds in a thermally independent fashion inside reformer 20. In other words, if oxygen (air) is abundant, heat emission by the partial oxidation reforming reaction POX dominates, and if steam is abundant, the endothermic steam reforming reaction SR dominates. At this stage, the initial stage of startup has passed and some degree of elevated temperature has been achieved within generating chamber 10, therefore even if the endothermic reaction is dominant, no major drop in temperature will be caused. Also, the combustion reaction continues within combustion chamber 18 even while the auto-thermal reforming reaction ATR is proceeding.

When, after starting the auto-thermal reforming reaction ATR, reformer temperature sensor 146 senses that reformer 20 has reached a predetermined temperature (e.g., 700° C.), the supply of reforming air by reforming air flow regulator unit 44 is stopped and the supply of steam by water flow regulator unit 28 is increased. A gas containing no air and containing only fuel gas and steam is thus supplied to reformer 20, where the steam reforming reaction SR of Expression (3) proceeds.

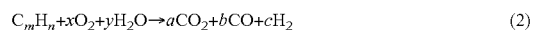

$$C_mH_n + xO_2 + yH_2O \rightarrow aCO_2 + bCO + cH_2 \qquad (2)$$

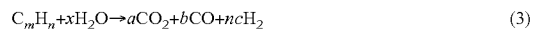

$$C_mH_n + xH_2O \rightarrow aCO_2 + bCO + ncH_2 \qquad (3)$$

This steam reforming reaction SR is an endothermic reaction, therefore the reaction proceeds while thermal balance is maintained with the combustion heat from combustion chamber 18. At this stage, fuel cell module 2 is in the final stages of startup, therefore the temperature has risen to a sufficiently high level within generating chamber 10 so that no major temperature drop is induced in generating chamber 10 even though an endothermic reaction is proceeding. Also, the combustion reaction continues to proceed in combustion chamber 18 even if the steam reforming reaction SR is proceeding.

Thus, after fuel cell module 2 has been ignited by ignition device 83, the temperature inside generating chamber 10 gradually rises due to the sequentially proceeding partial oxidation reforming reaction POX, auto-thermal reforming reaction ATR, and steam reforming reaction SR. Next, when the temperatures of interior of generating chamber 10 and individual fuel cells 84 reach a predetermined generating temperature below the rated temperature at which fuel cell module 2 can be stably operated, the circuit including fuel cell module 2 is closed and electrical generation by fuel cell module 2 begins, such that current flows in the circuit. Generation of electricity by fuel cell module 2 causes fuel cell 84 itself to emit heat, such that the temperature of fuel cell 84 also rises. The rated temperature for operating fuel cell module 2, for example 600° C. to 800° C., is therefore reached.

Thereafter, in order to maintain the rated temperature, fuel gas and air are supplied in a quantity greater than the fuel gas and air consumed by individual fuel cells 84, and combustion in combustion chamber 18 is continued. Note that during electrical generation, generation of electricity by the high reforming-efficiency steam reforming reaction SR proceeds.

Figure 8:
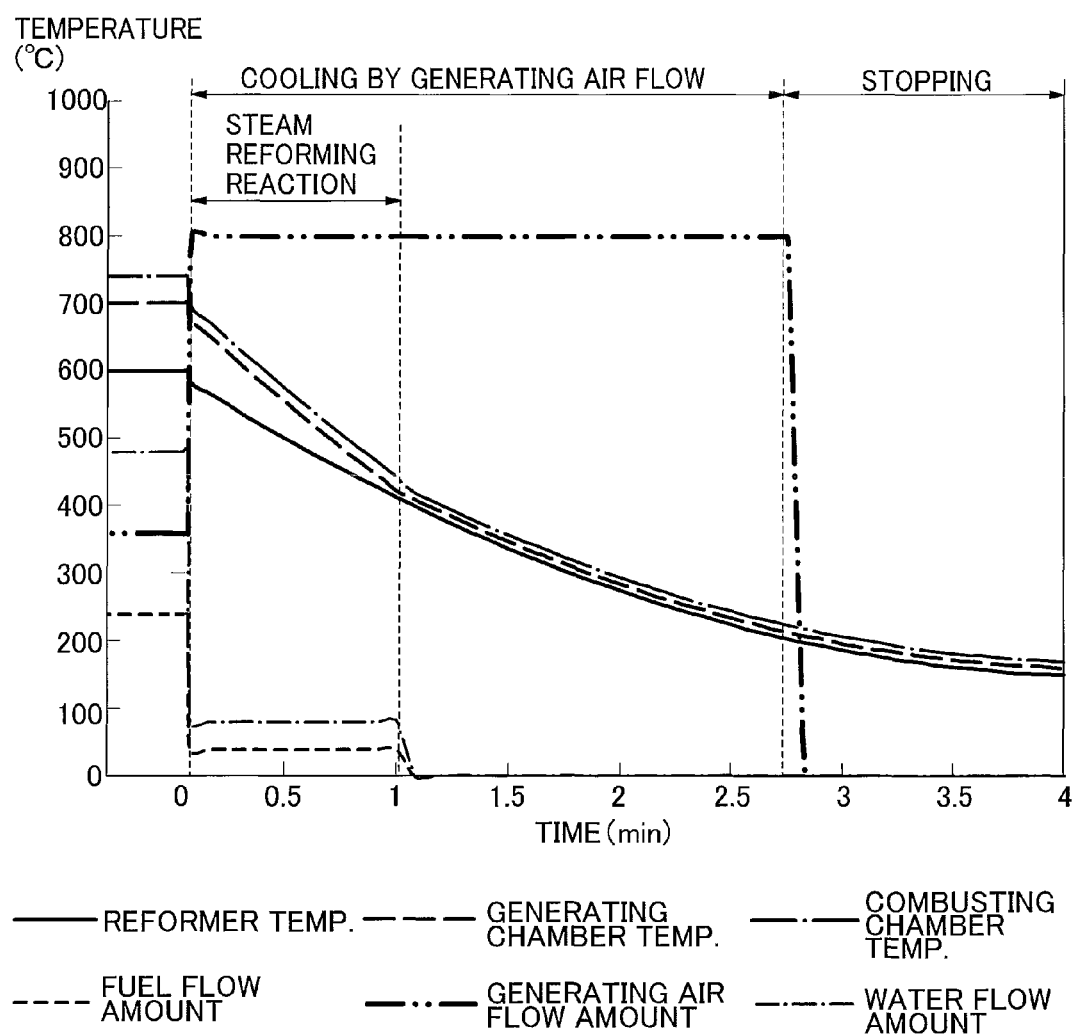
FIG. 8: A timing chart showing the operation of a fuel cell apparatus according to an embodiment of the present invention when stopped.

Next, referring to FIG. 8, we discuss the operation when stopping the solid oxide fuel cell (SOFC) of the present embodiment. FIG. 8 is a timing chart showing what occurs upon stopping the operation of solid oxide fuel cell (SOFC) system of the present embodiment.

As shown in FIG. 8, when the operation of fuel cell module 2 is stopped, fuel flow regulator unit 38 and water flow regulator unit 28 are first operated to reduce the quantity of fuel gas and steam being supplied to reformer 20.

When stopping the operation of fuel cell module 2, the amount of generating air supplied by reforming air flow regulator unit 44 into fuel cell module 2 is being increased at the same time that the amount of fuel gas and steam being supplied to reformer 20 is being reduced; fuel cell assembly 12 and reformer 20 are air cooled to reduce their temperatures. Thereafter when the reformer 20 temperature has dropped to a predetermined temperature, for example 400° C., the supply of fuel gas and steam to the reformer 20 is stopped, and the reformer 20 steam reforming reaction SR is ended. Supply of generating air continues until the temperature in reformer 20 reaches a predetermined temperature, e.g. 200° C., and when the predetermined temperature is reached, the supply of generating air from generating air flow regulator unit 45 is stopped.

Thus in the present embodiment when operation of the fuel cell module 2 is stopped, the steam reforming reaction SR by reformer 20 and cooling by generating air are used in combination, therefore operation of the fuel cell module can be stopped relatively quickly.

Figure 9:
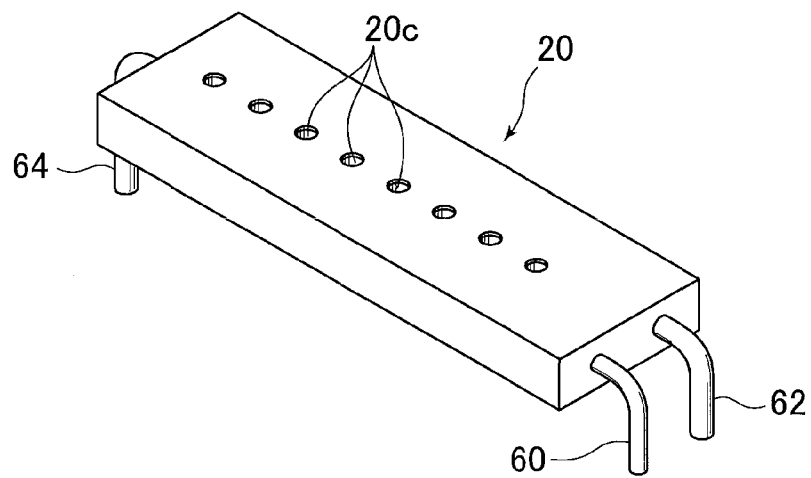
FIG. 9: A perspective view of a fuel cell apparatus reformer according to an embodiment of the present invention.
Figure 10:
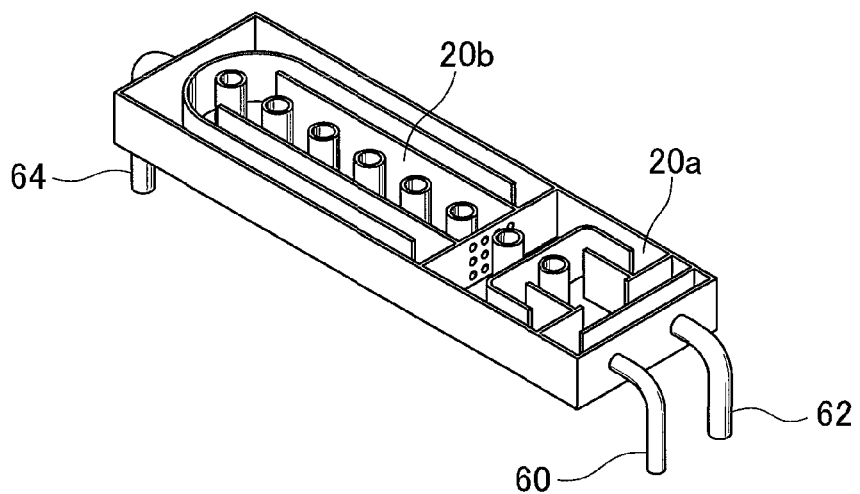
FIG. 10: A perspective view showing the interior of a reformer with the top plate removed, in a fuel cell apparatus according to an embodiment of the present invention.
Figure 11:
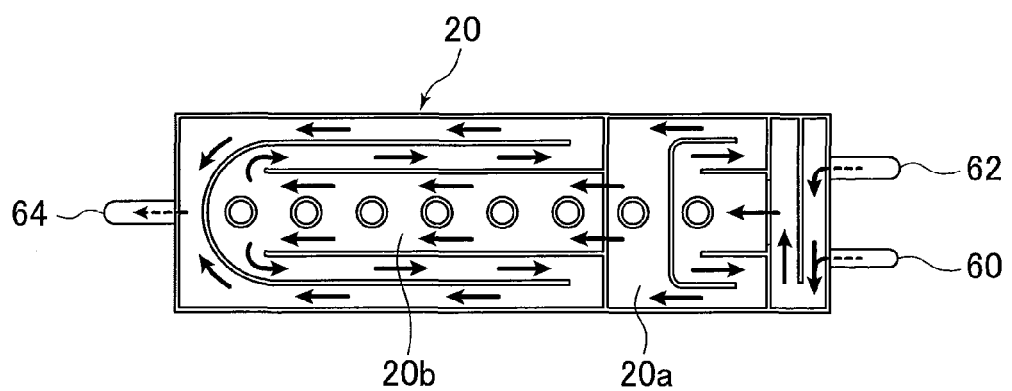
FIG. 11: A plan view showing the flow of fuel inside a reformer in a fuel cell apparatus according to an embodiment of the present invention.

Next, referring to FIGS. 9 through 11, we discuss the detailed constitution of reformer 20.

FIG. 9 is a perspective view of reformer 20; FIG. 10 is a perspective view showing the interior of reformer 20 with the top plate removed. FIG. 11 is a plan view cross section showing the flow of fuel in reformer 20.

As shown in FIG. 9, reformer 20 is a rectangular parallelepiped metal box, filled internally with a reforming catalyst for reforming fuel. Connected on the upstream side of reformer 20 is a pure water introducing pipe 60 for introducing water, and a reformed gas introducing pipe 62 for introducing fuel and reforming air. In addition, a fuel gas supply pipe 64 is connected on the downstream side of reformer 20 for discharging fuel reformed in the interior of reformer 20. There are also 8 air passage openings 20c placed along the longitudinal direction on reformer 20. These air passage openings 20c are placed so as to penetrate from the bottom surface to the top surface of reformer 20 in such a way that combustion gas combusted in combustion chamber 18 (FIG. 2) at the bottom of reformer 20 will smoothly escape from the top of reformer 20; air passage openings 20c do not communicate with the interior of reformer 20.

As shown in FIG. 10, steam generating section 20a is placed on the interior of reformer 20 on the upstream side; reforming section 20b is placed adjacent to this steam generating section 20a on the downstream side. A winding passageway is formed within steam generating section 20a by the disposition of multiple partitioning plates. Water introduced into reformer 20 is vaporized at an elevated temperature inside vaporizing section 20a and becomes steam. Fuel gas and reforming air introduced into reformer 20 are mixed with steam as they pass through the winding pathway of the steam producing section.

At the same time, a winding passageway is also formed inside reforming section 20b by the disposition of multiple partitioning plates, and this passageway is filled with catalyst. Fuel gas and reforming air blended in the vaporizing section 20a are subjected to the partial oxidation reforming reaction as they pass through the passageway in reforming section 20b. When a mixture of fuel gas, steam, and reforming air are introduced from vaporizing section 20a, a partial oxidation reforming reaction and a steam reforming reaction occur in reforming section 20b. In addition, when a mixture of fuel gas and steam are introduced from vaporizing section 20a, only the steam reforming reaction occurs in reforming section 20b.

As shown in FIG. 11, fuel gas, water, and reforming air introduced into the reformer 20 steam generating section 20a first flow sinuously in the lateral direction of reformer 20, then are split into two passageways, snaking in the longitudinal direction of reformer 20. Furthermore, the passageways once again merge and are connected to reforming section 20b at the center part of reformer 20. After flowing longitudinally in the center of reformer 20, fuel and the like introduced into reforming section 20b are split in two and returned; the two passageways are again returned and directed toward the downstream end of reforming section 20b, where they are merged to flow into fuel gas supply pipe 64. As it passes through the passageway, winding in the manner described, fuel is reformed by the catalyst with which the passageway is filled.

Next, referring to FIGS. 7 through 12, we explain details of the reforming reaction which occurs inside the reformer at the time of startup of the solid oxide fuel cell (SOFC) of the present embodiment.

FIG. 12 is an operation table showing the fuel cell 1 startup processing procedure. As shown in FIG. 12, in the startup step control section 110, which is a control device, executes each of the operating control states (the combustion operating step, POX1 step, POX2 step, ATR1 step, ATR2 step, SR1 step, SR2 step) in temporal sequence, then transitions to the generating step.

Note that the POX 1 and POX2 steps are steps (POX steps) in which a partial oxidation reforming reaction is carried out inside the reformer 20. The POX 1 step and POX2 step are steps (ATR steps) in which the auto-thermal reforming reaction is carried out inside reformer 20. The SR1 and SR2 steps are steps (SR steps) in which a steam reforming reaction is carried out inside the reformer 20. Each of the above POX, ATR, and SR steps is respectively subdivided in two, but these may be subdivided into three or more without such limitation, and a constitution without such subdivisions is also possible. Thus control section 110 sequentially implements the POX step, ATR step, and SR step in a predetermined temperature band in fuel cell module 2, raising fuel cell stack 14 to a temperature at which electrical generation is possible.

First, when solid oxide fuel cell 1 is started at time $t_0$ in FIG. 7, control section 110 sends a signal to reform air flow regulator unit 44, which is a reforming oxidant gas supply apparatus, and to generating air flow regulator unit 45, which is a generating oxidant gas supply apparatus, starting these up and supplying reforming air (oxidant gas) and generating air to fuel cell module 2. Note that in the present embodiment, the amount of reforming air supplied when supply is started at time $t_0$ is set at 18.0 (L/min), and the amount of generating air supplied at 100.0 (L/min) (see the "Combustion Operation" step in FIG. 12).

Next, at time $t_1$, control section 110 sends a signal to fuel flow regulator unit 38 and starts the supply of fuel to reformer 20. As a result, fuel and reforming air passes through reformed gas introducing pipe 62 and is introduced into reformer 20; fuel and reforming air fed into reformer 20 are fed into each of the individual fuel cell units 16, i.e., fuel cell stack 14, through reformer 20, fuel gas supply pipe 64, and manifold 66. Fuel and reforming air fed into each of the individual fuel cell units 16 flows out from the top end of the gas flow paths 98 on individual fuel cell units 16. Note that in the present embodiment, the amount of reforming fuel supplied when supply is started at time $t_1$ is set at 6.0 (L/min), (see the "Combustion Operation" step in FIG. 12).

Furthermore, at time $t_2$, control section 110 sends a signal to ignition device 83 and ignites the fuel flowing out from individual fuel cell units 16. Thus fuel is combusted inside combustion chamber 18, the heat of which results in the heating of reformer 20 disposed above it, as well as the start of a rise in the temperatures of combustion chamber 18, generating chamber 10, and the individual fuel cell units 16 disposed therein, i.e., fuel cell stack 14 (see times $t_2$-$t_3$ in FIG. 7). Individual fuel cell units 16, including gas flow paths 98, and the top end regions thereof correspond to the combustion portion.

Next, when a predetermined time has elapsed after ignition at time $t_2$, localized temperature rise suppression circuit 110$a$ (FIG. 6), built into control section 110, sends a signal to water flow volume regulator unit 28 at time $t_3$ starting the supply of water to reformer 20. Note that in the present embodiment, the amount of reforming water supplied when supply is started at time $t_3$ is set at 1.0 (cc/min), (see the "Combustion Operation" step in FIG. 12). Note that in the present embodiment, water flow volume regulator unit 28 is constituted to intermittently supply pure water one drop at a time, and the amount of supply per minute is 1.0 cc. As a variant example, water flow volume regulator unit 28 can be constituted to supply water to reformer 20.

Water introduced into vaporizing section 20$a$ of reformer 20 through water flow volume regulator unit 28 is gradually vaporized as the temperature of vaporizing section 20$a$ rises. The start of the introduction of water to vaporizing section 20$a$ results in the supply of fuel, reforming air, and water to vaporizing section 20$a$, and the flow of a mixture of these into the reforming section 20$b$ of reformer 20. However, at time $t_3$, the temperature of reforming section 20$b$ has still not risen sufficiently, so neither a partial oxidation reforming reaction or a steam reforming reaction occurs in reforming section 20$b$. Thus localized temperature rise suppression circuit 110$a$ starts the supply of water to reformer 20 at a time when the temperature inside fuel cell module 2 has not reached the temperature band at where the ATR step is executed, and before the temperature reaches the 300° C. at which the POX step begins.

Next, when the temperature of reformer 20 ("the reformer temperature" below) rises to approximately 300° C., the partial oxidation reforming reaction (POX) occurs inside reforming section 20$b$ (time $t_4$: start of POX1 step). In this POX1 step, the fuel supply amount is maintained at 6.0 (L/min), as are the reforming air supply amount, at 18.0 (L/min), and the water supply amount, at 1.0 (cc/min) (see the "POX1" step in FIG. 12). Because the partial oxidation reforming reaction is an exothermic reaction, reformer 20 is also heated by the reaction heat produced by the partial oxidation reforming reaction (FIG. 7, time $t_4$ to $t_6$).

Note that along with fuel and reforming air, water is also being introduced into reformer 20, but at times $t_4$ to $t_6$, the temperature of reforming section 20$b$ is low, so the steam reforming reaction does not occur throughout and continuously within reforming section 20$b$. However, when the point is reached that a partial oxidation reforming reaction can occur within reforming section 20$b$, because this is an exothermic reaction large localized temperature rises in reforming section 20$b$ occur in parts where a lot of partial oxidation reforming reaction has occurred. This temperature rise can produce many oxidation reforming reactions in the parts which the temperature has risen, and the temperature of those parts rises further. The occurrence of such a phenomenon causes part of the inside of reforming section 20$b$ to rise locally to the 500-600° C. temperature at which the steam reforming reaction takes place.

Because such a temperature rise occurs locally within reforming section 20$b$, it is not reflected in the temperature detected by reformer temperature sensor 148 (FIG. 6). Therefore the temperature detected by reformer temperature sensor 148 transitions at the relatively low temperatures shown over times $t_4$-$t_6$ in FIG. 7. When a localized temperature rise occurs inside reforming section 20$b$, steam is being introduced into reforming section 20$b$ along with fuel and reforming air, so a localized steam reforming reaction occurs in parts which have risen to the temperature at which the steam reforming reaction is possible. Here, since the steam reforming reaction is an endothermic reaction, the temperature drops in parts where the steam reforming reaction occurs. When the steam reforming reaction occurs and the temperature of reforming section 20$b$ drops down to a temperature at which the steam reforming reaction no longer occurs, the steam reforming reaction which had been occurring ceases. In this way, the parts within reforming section 20$b$ which had locally risen in temperature are locally cooled by the temporary occurrence of the steam reforming reaction, and the temperature inside reforming section 20$b$ is made uniform. Also, even if there is an excessive temperature rise over a relatively wide range inside reforming section 20$b$, water is gradually supplied (at 1.0 cc/min), so there is no sudden large volume steam reforming reaction SR and sudden drop in the temperature of reforming section 20$b$.

Note that, as discussed above, in the POX1 step the fuel supply amount is 6.0 (L/min) and the reforming air supply amount is 18.0 (L/min), and the $O_2/C$ ratio between oxygen O in the reforming air and carbon C in the fuel is approximately 0.54 (see the "$O_2/C$" column in FIG. 12). Here the ratio $O_2/C=1$ corresponds to a state in which the number of carbon atoms in the fuel is equal to the number of $O_2$ oxygen molecules in the reforming air. Theoretically, therefore, in a state in which the ratio $O_2/C=0.5$, all of the carbon C in the fuel will react with all of the oxygen molecules $O_2$ in the reforming air, and all the carbon in the fuel will become carbon monoxide; when the ratio $O_2/C$ falls below 0.5, excess carbon is produced, resulting in problems such as carbon deposition, etc. In actuality, however, because the carbon in the fuel reacts with minute amounts of water, etc. contained in the reforming air, the value of the ratio $O_2/C$ can in some cases drop down to approximately 0.4. The value of 0.54 for the ratio $O_2/C$ in the POX1 step of the present embodiment is an oxygen $O_2$ to carbon C proportion which reliably enables carbon deposition to be avoided and fuel to be partial-oxidation reformed, even when steam for the steam reforming reaction in reforming section 20$b$ is not being supplied.

When the temperature rises further and the reformer temperature reaches 350° C. (the POX2 transition condition), control section 110 sends a signal to fuel flow regulator unit 38 reducing the amount of fuel supplied, and sends a signal to fuel flow regulator unit 38 reducing the amount of reforming air supplied (FIG. 7 time $t_5$: POX2 process start). The reforming air supply amount is thus changed to 5.0 (L/min), and the reforming air supply amount is changed to 15.0 (L/min) (see the "POX2" step in FIG. 12). Even after these changes in supply amount, the ratio of oxygen $O_2$ to carbon C is maintained at 0.54; this supply amount is an appropriate supply amount to produce a partial oxidation reforming reaction. I.e., in the initial temperature region where the partial oxidation reforming reaction starts, increasing the proportion of fuel supplied creates a state in which fuel can be reliably ignited, and maintaining that supply amount stabilizes ignition (see the "POX1" step in FIG. 12). Moreover, after stable ignition and temperature rise, wastage of gas is suppressed by using necessary and sufficient fuel to produce a partial oxidation reforming reaction (see the "POX2" step in FIG. 12). In this POX2 step, as well, localized temperature rises occur inside reforming section 20b due to the partial oxidation reforming reaction, and localized cooling occurs due to the accompanying steam reforming reaction. However, because cooling caused by the steam reforming reaction quickly reduces the temperature in those parts, the steam reforming reaction quickly ends, and does not proceed continuously.

Next, at time $t_6$ in FIG. 7, when the reformer temperature reaches 600° C. or above, and the cell stack temperature reaches 250° C. or above (the ATR1 transition condition), control section 110 sends a signal to water flow regulator unit 28, which is the water supply apparatus, increasing the supply of water (starting the ATR1 step). The water supply amount is thus changed to 2.0 (cc/min). Thus the amount of water per unit time which has been pre-supplied by the localized temperature rise suppression circuit is set to be less than the amount of water per unit time supplied in the ATR1 step. Next, control section 110 sends a signal to reform air flow regulator unit 44, reducing the reforming air supply amount after a predetermined delay following the increase in water supply amount. The reforming air supply amount is thus changed to 7.0 (L/min), (see the "ATR1" step in FIG. 12). When the reformer temperature detected by reformer temperature sensor 148 rises to 600° C. or above, i.e., when the temperature of reformer 20 rises overall to 600° C. or above, the steam reforming reaction occurs throughout and continuously inside reforming section 20b.

At this ratio $O_2/C=0.25$, oxygen used in the partial oxidation reforming reaction is insufficient, so if no steam reforming reaction is occurring, then carbon deposition occurs inside reforming section 20b. Therefore in the ATR1 step fuel reforming is performed through the combined use of partial oxidation reforming and steam reforming, by supplying sufficient steam for steam reforming.

When the temperature inside reforming section 20b thus rises and the temperature around reformer 20 has also risen, the temperature inside reforming section 20b cannot be easily reduced even if heat is absorbed by the steam reforming reaction inside reforming section 20b, and the steam reforming reaction occurs continuously. I.e., in the "ATR1" step in FIG. 12, auto-thermal reforming (ATR) is being carried out, in which the partial oxidation reforming reaction and the steam reforming reaction both occur continuously within reforming section 20b. Note that at the start of the ATR1 step, after the amount of water supplied has been increased, the reforming air supply amount is being reduced following a predetermined delay. As a result, after heat absorption by the steam reforming reaction has increased due to the increase in water supply amount, the emission of heat caused by the partial oxidation reforming reaction is decreased after a predetermined delay, and a sudden temperature drop caused by the simultaneous occurrence of the increase in heat absorption and the decrease in heat emission can be avoided.

In the ATR1 step, when a state is reached in which the partial oxidation reforming reaction and the steam reforming reaction occur continuously throughout reforming section 20b, the heat emission by the partial oxidation reforming reaction and the heat absorption by the steam reforming reaction approach equilibrium, and the temperature rise detected by reformer temperature sensor 148 becomes extremely gradual compared to the POX2 step. Thus while there is localized mixing of the partial oxidation reforming reaction and the steam reforming reaction in the POX1 and POX2 steps, as well, the steam reforming reaction in the POX step is localized, and is qualitatively different from the ATR step, in which the partial oxidation reforming reaction and the steam reforming reaction are mixed throughout.

In addition, at time $t_7$ in FIG. 7, when the reformer temperature reaches 600° C. or above, and the stack temperature reaches 400° C. or above (the ATR2 transition condition), control section 110 sends a signal to fuel flow regulator unit 38 to reduce the fuel supply amount. Also, control section 110 sends a signal to reform air flow regulator unit 44 reducing the amount of reforming air supplied, while also sending a signal to water flow regulator unit 28 increasing the amount of water supplied (ATR2 process start). The amount of fuel supplied is thus changed to 4.0 (L/min), the amount of reforming air supplied is changed to 5.0 (L/min), and the amount of water supplied is changed to 3.0 (cc/min) (see the "ATR2" step in FIG. 12). Note that the ratio $O_2/C$ of oxygen $O_2$ in reforming air and carbon C in fuel is approximately 0.23 in the ATR2 step (see the "$O_2/C$" column in FIG. 12). Inside reformer 20, the reduction in the reforming air supply amount and increase in the water supply amount causes the proportion of the exothermic partial oxidation reforming reaction in reformer 20 to decrease, and the proportion of the endothermic steam reforming reaction to increase. This causes the rise in reformer temperature to be suppressed, while the raising of the fuel cell stack 14 temperature by the flow of gas received from reformer 20 causes the cell stack temperature to rise so as to catch up with the reformer temperature, such that the temperature difference between the two is reduced, and the temperature of both is stably raised.

Next, at time $t_8$ in FIG. 7, the temperature difference between the reformer temperature and the cell stack temperature shrinks, and when the reformer temperature reaches 650° C. or above, and the cell stack temperature reaches 600° C. or above (the SR1 transition condition), control section 110 sends a signal to reform air flow regulator unit 44, stopping the supply of reforming air. Also, control section 110 sends a signal to fuel flow regulator unit 38 reducing the amount of fuel supplied, while also sending a signal to water flow regulator unit 28 increasing the amount of water supplied (the start of the SR1 step). The fuel supply amount is thus changed to 3.0 (L/min), and the water supply amount is changed to 8.0 (cc/min) (see the "SR1" step in FIG. 12). Stopping the supply of reforming air results in a cessation of the partial oxidation reforming reaction inside reformer 20, and an SR is started in which only the steam reforming reaction occurs.

In addition, at time $t_9$ in FIG. 7, the difference between the reformer temperature and the cell stack temperature shrinks further, and when the reformer temperature reaches 650° C. or above, which is the SR2 transition reformer temperature, and the cell stack temperature reaches 650° C. or above (the SR2 transition condition), control section 110 sends a signal to fuel flow regulator unit 38 reducing the fuel gas supply amount, and sends a signal to water flow regulator unit 28 reducing the water supply amount. Control section 110 then sends a signal to generating air flow regulator unit 45 reducing the generating air supply amount as well (the start of the SR2 step). The amount of fuel supplied is thus changed to 2.3 (L/min), the amount of water supplied is changed to 6.3 (cc/min), and the amount of generating air supplied is changed to 80.0 (L/min) (see the "SR2" step in FIG. 12).

In the SR2 step, control section 110 maintains each supply amount for the predetermined generating transition time or greater, and when the reformer temperature has reached 650° C. or above and the stack temperature has reached 700° C. (the electrical generation step transition condition), it causes power to be output by inverter 54 from fuel cell module 2, transitions to the generating step, and starts electrical generation (at time $t_{10}$ in FIG. 7: start of the electrical generation step). Thereafter, in order produce electrical power in response to power demand, control section 110 sends signals to fuel flow regulator unit 38 and water flow regulator unit 28 changing the fuel supply amount and water supply amount, and a load-following operation is executed.

In the solid oxide fuel cell system 1 of the embodiment of the present invention, localized temperature rise suppression circuit 110a induces localized steam reforming in parts where localized excessive temperature rises occur inside reformer 20 during the POX step, suppressing localized temperature rises with the heat absorption of the steam reforming reaction. Temperature unevenness in reformer 20 can thus be suppressed, and the durable lifespan of the reformer 20 can be extended and damage to the reformer 20 can be prevented.

Also, using solid oxide fuel cell system 1 of the present embodiment, the supply of water is started before the temperature of reformer 20 in fuel cell module 2 rises to the 600° C. at which the ATR step is executed (time $t_3$ in FIG. 7). Therefore in the ATR step, water is supplied to reformer 20 before steam reforming begins to occur continuously and throughout reformer 20, so that if localized temperature rises occur, steam reforming occurs locally in those locations, and the temperature in those parts can be reduced. Thus by using the simple control of starting the supply of water before the temperature rises into the temperature band in which the ATR step is executed (FIG. 9; a reformer temperature of 600° C. or above), temperature unevenness in reformer 20 can be effectively suppressed.

In addition, in the present embodiment, the timing at which the supply of water to reformer 20 is started by localized temperature rise suppression circuit 110a precedes the time at which the temperature rises to the temperature band in which the POX step is executed (FIG. 9; a reformer temperature of 300° C. or above), which allows excessive temperature rises in reformer 20 caused by localized excessive partial reforming to be more reliably suppressed. Also, in the present embodiment the supply of water to reformer 20 is started (time $t_2$ in FIG. 7) after fuel is ignited (time $t_2$ in FIG. 7), therefore the negative effects of water introduced into reformer 20 remaining there for long periods without being vaporized can be prevented, and localized excessive partial reforming when the temperature of the entire reformer 20 is relatively low can be reliably suppressed.

Also, in the solid oxide fuel cell system 1 of the present embodiment, fuel and reforming air supplied from fuel flow regulator unit 38 and reform air flow regulator unit 44 flow into reforming section 20b through a reforming section inflow port via vaporizing section 20a, so there is a tendency for sudden temperature rises to occur due to localized excessive partial oxidation reforming near the inflow port from vaporizing section 20a to reforming section 20b. In the solid oxide fuel cell 1 of the present embodiment, if localized temperature rises occur near the inflow port of the reformer, steam can be quickly provided to those parts from vaporizing section 20a. Also, if there is a localized temperature rise near the inflow port on the upstream side of the reformer, the temperature of the vaporizing section 20a adjacently disposed to the reforming section 20b also rises, such that vaporizing of supplied water is promoted, and more steam can be supplied relative to localized temperature rises.

In the solid oxide fuel cell system 1 of the present embodiment, water is supplied to reformer 20 intermittently by water flow volume regulator unit 28, therefore rapid temperature drops in reformer 20 caused by a large quantity of water being supplied at once, such that a large amount of steam reforming occurs in a short time, can be prevented. The amount of water supplied by localized temperature rise suppression circuit 110a (1.0 cc/min in FIG. 9) is set to be less than the amount of water in the ATR1 and ATR2 steps (2.0 cc/min and 3.0 cc/min, respectively, in FIG. 9), therefore in the POX step a large amount of steam reforming occurs in order to suppress localized excessive temperature rises, and a delay in the overall temperature rise of the reformer can be avoided.

Furthermore, in the solid oxide fuel cell system 1 of the present embodiment, localized steam reforming occurs during the POX step, and if, when transitioning from such a POX step to the ATR step, the water supply amount is increased so as to increase steam reforming while simultaneously the reforming air supply amount is decreased so as to decrease partial oxidation reforming (time $t_6$ in FIG. 7), there is a risk that the temperature of reformer 20 will suddenly drop if the supply amount of reforming error is decreased so as to decrease partial oxidation reforming. In the present embodiment, the supply amount of reforming air is reduced after a delay, therefore partial oxidation reforming remains even after steam reforming has been increased, and sudden temperature drops in reformer 20 can be prevented.

In the solid oxide fuel cell system 1 of the present embodiment, the control section 110 sets the ratio $O_2/C$ of oxygen $O_2$ in the reforming oxidant gas to carbon C in the fuel at 0.54 which is greater than 0.4, such that fuel reforming can occur by the partial oxidation reforming reaction alone in the POX step. In the ATR step, the ratio $O_2/C$ is set at 0.25 (ATR1 step) or 0.23 (ATR2 step) which is greater than 0.2 and less than 0.4. The localized temperature rise suppression circuit 110a supplies water to vaporizing section 20a in a state where the ratio $O_2/C$ is greater equal than 0.4. Thus in the present embodiment, the localized temperature rise suppression circuit 110a supplies water to vaporizing section 20a when the ratio oxygen $O_2/C$ of oxygen $O_2$ to carbon C is at a proportion such that fuel reforming can occur by the partial oxidation reforming reaction alone. Therefore in a state in which localized excessive temperature rises are prone to occur in reformer 20, steam reforming can be reliably induced when an excessive temperature rise does occur, and deleterious effects on the catalyst inside reformer 20 can be suppressed.

Moreover, in the solid oxide fuel cell 1 of the present embodiment, water is supplied during the entire period of the POX1 and POX2 steps in which a temperature rise can easily occur (time $t_4$-$t_6$ in FIG. 7), hence degradation of reformer 20 due to excessive temperature rise can be reliably prevented.

We have described above a preferred embodiment of the present invention, but various changes may be added to the above-described embodiment. In particular, in the embodiment described above, the supply of water by localized temperature rise suppression circuit 110a was begun when a predetermined time had elapsed after ignition in the combustion chamber, but it is also acceptable for the supply of water to be started around the time of ignition or during the POX step.

The invention claimed is:

1. A solid oxide fuel cell system in which electrical power is produced by reacting fuel and oxidant gas for electrical generation, comprising:
   a fuel cell module equipped with a fuel cell stack;
   a reformer, disposed inside the fuel cell module, that produces hydrogen by performing a POX step, an ATR step, and an SR step, wherein in the POX step a reforming reaction for partial oxidation reforming of fuel is performed by chemically reacting the fuel with oxidant gas, in the ATR step a reforming reaction for auto-thermal reforming of fuel is performed by simultaneously bringing about the partial oxidant reforming reaction and a steam reforming reaction in which fuel and steam are chemically reacted, and in the SR step a reforming reaction is performed by the steam reforming only;
   a combustion chamber, disposed inside the fuel cell module, wherein fuel which has passed through the reformer and the fiael cell stack is combusted to heat the reformer;
   a fuel supply apparatus that feeds fuel reformed by the reformer to the fuel cell stack by supplying fuel to the reformer;
   a reforming oxidant gas supply apparatus that supplies reforming oxidant gas to the reformer;
   a water supply apparatus that supplies reforming water to the reformer;
   an electrical generating oxidant gas supply apparatus that supplies electrical generating oxidant gas for electrical generation to the fuel cell stack; and
   a control device that controls the fuel supply apparatus, the reforming oxygen gas supply apparatus, the water supply apparatus, and the electrical generating oxidant gas supply apparatus based on the temperature in the fuel cell module so that the POX step, the ATR step, and the SR step are executed in predetermined respective temperature bands in sequence inside the reformer, to raise the temperature of the fuel cell stack to the temperature at which electrical generation is possible;
   wherein the control device includes a localized temperature rise suppression circuit that suppressed localized temperature rises in the reformer by inducing steam reforming in parts within the reformer when there are localized excessive temperature rises during the POX step.

2. The solid oxide fuel cell system according to claim 1, wherein the reformer includes a vaporizing section that vaporizes water supplied from the water supply apparatus, and reforming oxidant gas from the reforming oxidant gas supply apparatus is supplied to the vaporizing section; and a reforming section adjacently disposed on the downstream side of the vaporizing section, that reforms fuel using a catalyst; wherein fuel and reforming oxidant gas supplied from the fuel supply apparatus and the reforming oxidant gas supply apparatus flow into the upstream side of the reforming section through the vaporizing section.

3. The solid oxide fuel cell system according to claim 2, wherein the control device controls the fuel supply apparatus and the reforming oxidant gas supply device so that in the POX step, the ratio $O_2/C$ of oxygen $O_2$ in the reforming oxidant gas to carbon C in the fuel is 0.4 or greater, and in the ATR step the ratio $O_2/C$ is 0.2 or greater and less than 0.4, so that reforming of fuel can be carried out by the partial oxidation reforming reaction alone in the reformer, and the localized temperature rise suppression circuit supplies water to the vaporizing section using the water supply device at an $O_2/C$ ratio at 0.4 or greater.

4. The solid oxide fuel cell system according to claim 3, wherein the localized temperature rise suppression circuit supplies water to the vaporizing section using the water supply apparatus during the entire period of the POX step.

5. Solid oxide fuel cell system according to claim 4, wherein the localized temperature rise suppression circuit starts the supply of water to the reformer before the temperature inside the fuel cell module rises to the temperature band at which the POX step is executed.

6. The solid oxide fuel cell system according to claim 5, wherein the localized temperature rise suppression circuit causes the supply of water to the reformer to start after fuel introduced into the combustion chamber is ignited.

7. The solid oxide fuel cell system according to claim 4, wherein the localized temperature rise suppression circuit controls the water supply apparatus, causing water to be supplied to the reformer either continuously or intermittently, and the amount of water supplied per unit time by the localized temperature rise suppression circuit is less than the amount of water supplied per unit time in the ATR step.

* * * * *